United States Patent
Kozakaya (10) Patent No.: US 7,894,636 B2
(45) Date of Patent: Feb. 22, 2011

(54) APPARATUS AND METHOD FOR PERFORMING FACIAL RECOGNITION FROM ARBITRARY VIEWING ANGLES BY TEXTURING A 3D MODEL

(75) Inventor: Tatsuo Kozakaya, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1046 days.

(21) Appl. No.: 11/438,364

(22) Filed: May 23, 2006

(65) Prior Publication Data

US 2006/0269143 A1 Nov. 30, 2006

(30) Foreign Application Priority Data

May 23, 2005 (JP) .............................. 2005-150213
Sep. 15, 2005 (JP) .............................. 2005-268983

(51) Int. Cl.
G06K 9/00 (2006.01)
(52) U.S. Cl. ..................................... 382/118; 382/154
(58) Field of Classification Search ................. 382/118, 382/154; 345/419–421, 426, 427, 582, 585
See application file for complete search history.

(56) References Cited

U.S. PATENT DOCUMENTS

| | | | | |
|---|---|---|---|---|
| 5,164,992 | A * | 11/1992 | Turk et al. | 382/118 |
| 6,002,782 | A * | 12/1999 | Dionysian | 382/118 |
| 6,381,346 | B1 * | 4/2002 | Eraslan | 382/118 |
| 6,434,278 | B1 * | 8/2002 | Hashimoto | 382/285 |
| 6,466,685 | B1 * | 10/2002 | Fukui et al. | 382/115 |
| 7,486,825 | B2 * | 2/2009 | Yuasa | 382/190 |
| 2002/0030678 | A1 * | 3/2002 | Ostermann | 345/420 |
| 2002/0106114 | A1 * | 8/2002 | Yan et al. | 382/118 |
| 2003/0161537 | A1 * | 8/2003 | Maeda et al. | 382/218 |
| 2003/0198366 | A1 | 10/2003 | Fukui et al. | |

FOREIGN PATENT DOCUMENTS

| | | |
|---|---|---|
| CN | 1341401 A | 3/2002 |
| JP | 61-067187 | 4/1986 |

(Continued)

OTHER PUBLICATIONS

Cobzas et al. (Mar. 2003) "Recent methods for image-based modeling and rendering." IEEE Virtual Reality 2003 Tutorial I, Jagersand, M., Ed. Ch. 3 pp. 19-35.*

(Continued)

Primary Examiner—Brian P Werner
Assistant Examiner—Barry Drennan
(74) Attorney, Agent, or Firm—Finnegan, Henderson, Farabow, Garrett & Dunner, L.L.P.

(57) ABSTRACT

In an embodiment, a method for image recognition of an object having a three-dimensional shape, from a photographed image of the object, comprising: inputting the image; storing three-dimensional shape information as an origin of a three-dimensional model of the object; creating the three-dimensional model by using the input image and the three-dimensional shape information; creating plural pattern images in which the three-dimensional model is projected on a plane in different directions; extracting a feature quantity from the plural pattern images; holding a dictionary feature quantity of the object; and calculating a similarity degree between the extracted feature quantity and the dictionary feature quantity of the object to recognize the object based on the calculated similarity degree.

8 Claims, 8 Drawing Sheets

FOREIGN PATENT DOCUMENTS

| | | |
|---|---|---|
| JP | 2000-020735 | 1/2000 |
| JP | 2002-157595 | 5/2002 |
| JP | 2003-006645 | 1/2003 |
| JP | 2003-044873 | 2/2003 |
| JP | 2003-317099 | 11/2003 |

OTHER PUBLICATIONS

Tomasi et al. (Nov. 1993) "Shape and motion from image streams: a factorization method." Proc. National Academy of Sciences, vol. 90 pp. 9795-9802.*

Kozakaya et al. (Apr. 2006) "Face recognition by projection-based 3d normalization and shading subspace orthogonalization." Proc. 7th Int'l Conf. on Automatic Face and Gesture Recognition, pp. 163-168.*

Kozakaya et al. (Oct. 2005) "Projection-based 3d normalization for face recognition." IEIC Technical Report, vol. 105 No. 375, pp. 49-54.*

Neugebauer et al. (Sep. 1999) "Texturing 3d models of real world objects from multiple unregistered photographic views." Computer Graphics Forum, vol. 18 Issue 3, pp. 245-256.*

U.S. Appl. No. 11/504,597, filed Aug. 16, 2006, to Kozakaya.

Yamaguchi et al., "'Smartface'—A Robust Face Recognition System under Varying Facial Pose and Expression," IEICE Trans. Inf. & Syst. (Jan. 2003), E86-D:37-44.

Blanz et al., "A Morphable Model for the Synthesis of 3D Faces," Proc. SIGGRAPH (1999), pp. 187-194.

Fukui et al., "Facial Point Extraction Method Based on Combination of Shape Extraction and Pattern Matching," SINGAKURON D-II (1997), J80-D-II:2170-77.

Blanz, V. et al., "Face Recognition Based on Fitting a 3D Morphable Model," IEEE Transactions on Pattern Analysis and Machine Intelligence, vol. 25, No. 9, pp. 1063-1074, (Sep. 2003).

Jebara, T., "Face Normalization and Recognition," Undergraduate Thesis, Center for Intelligent Machines, McGill University, Chapter 4, pp. 61-97, (May 1996).

Notification of the First Office Action issued by the Chinese Patent Office on Jun. 1, 2007, for Chinese Patent Application No. 200610084850, and English-language translation thereof.

Notification of Reasons for Refusal from the Japanese Patent Office, drafted Jun. 29, 2009, in corresponding Japanese Application No. 2005-268983. (12 pages).

* cited by examiner

APPARATUS AND METHOD FOR PERFORMING FACIAL RECOGNITION FROM ARBITRARY VIEWING ANGLES BY TEXTURING A 3D MODEL

CROSS-REFERENCE TO RELATED APPLICATIONS

This application is based upon and claims the benefit of, priority from the prior Japanese Patent Application No. 2005-150213, filed on May 23, 2005; and Japanese Patent Application No. 2005-268983, filed on Sep. 15, 2005; the entire contents of which are incorporated herein by reference.

TECHNICAL FIELD

The present invention relates to an image recognition apparatus, an image recognition method and an image recognition program product, in which a three-dimensional model is created by using an input image and three-dimensional shape information, and a recognition processing is performed.

BACKGROUND OF THE INVENTION

Recognition using a face image is a very useful technique in security since, unlike a physical key or a password, there is no fear of loss or oblivion. However, the shape of the face is changed depending on the standing position of a user, or an individual difference in body type and the like, and further, the direction of the face is also not constant, and an illumination condition at the time of the recognition is not previously determined. Thus, in order to perform the recognition with high precision, it is indispensable to absorb a change in face pattern caused by these.

Hitherto, as a technique to perform personal identification by using a face image, for example, there is a method disclosed by O. Yamaguchi and K. Fukui (""Smartface"—A Robust Face Recognition System under Varying Facial Pose and Expression," IEICE Trans. On Information and Systems Vol. E86-D, No. 1, pp. 37-44, 2003. This corresponds to an English translation of Yamaguchi, Fukui, "Face Recognition System "smartface" Robust to Change in Face Direction and Expression" SINGAKURON (D-II), vol. J84-D-II, No. 6, p. 1045-1052, 2001.). By this method, a change in face pattern is suppressed by using moving images, and recognition is performed. In order to perform the recognition with high precision, it is important to collect various personal face patterns from the moving images, however, there is a problem that the pattern collection depends on the direction of the face of the user himself/herself. Besides, since plural images are required for both an input and a dictionary, for example, in a situation in which only one photograph can be used for the recognition, this method can not be applied.

According to a method of JP-2002-157595A (Japanese Patent Application Publication or Kokai 2002-157595), a measurement is previously performed by using a range finder to photograph a three-dimensional shape of a face, and a check is performed while the face shape is moved and rotated so that it has the same face direction as that of a check object. Since the accurate shape is photographed for each individual, the check can be performed while the direction and size of the face are corrected, however, the specific equipment is needed in order to photograph the shape. Besides, with respect to an image already photographed by a normal camera, such as one in, for example, a passport or a license, since the shape can not be obtained, this method can not be applied.

According to a method of V. Blanz and T. Vetter ("A morphable model for the synthesis of 3-D faces," in Proc. SIGGRAPH, 1999, pp. 187-194.), many face shapes are previously photographed, a model most similar to an input image is created by the linear combination of those, and the recognition can be performed. Although the shape, direction and size of a face and an illumination condition can be estimated from one image, since the three-dimensional shape information of a created face model depends on the previously photographed face shapes, the method can not be necessarily applied to an arbitrary face with high precision. Besides, since many parameters are estimated and the identification is performed, it takes much processing time.

As described above, in order to absorb various changes in human face patterns, although a method is effective in which various face patterns are collected or created by some methods and the identification is performed, in the related art, there have been problems that a lot of images are needed, the special equipment is required, and applicable faces are limited.

The invention has been made in order to solve the problems of the related art, and has an object to provide an image recognition apparatus, an image recognition method and an image recognition program product, which can be applied to an arbitrary face by using a general camera from an arbitrary number of images and by three-dimensional face model creation using three-dimensional shape information.

BRIEF SUMMARY OF THE INVENTION

According to embodiments of the present invention, an image recognition apparatus uses an image obtained by photographing an object having a three-dimensional shape and performs image recognition of the object, and includes an image input unit to which the image is inputted, a three-dimensional shape information holding unit configured to store three-dimensional shape information as an origin of a three-dimensional model of the object, a model creation unit configured to create the three-dimensional model by using the input image and the three-dimensional shape information, a pattern creation unit configured to create plural pattern images in which the three-dimensional model is projected on a plane in different directions, a feature extraction unit configured to extract a feature quantity from the plural pattern images, a registration dictionary holding unit configured to register a feature quantity of the object, and a similarity degree calculation unit configured to calculate a similarity degree between the extracted feature quantity and the registered feature quantity of the object and to recognize the object based on the calculated similarity degree.

According to embodiments of the present invention, an image recognition apparatus uses an image obtained by photographing an object having a three-dimensional shape and performs image recognition of the object, and includes an image input unit to which the image is inputted, a three-dimensional shape information holding unit configured to store three-dimensional shape information as an origin of a three-dimensional model of the object, a model creation unit configured to create the three-dimensional model by using the input image and the three-dimensional shape information, a texture perturbation unit configured to add two-dimensional changes to the three-dimensional model and to create plural pattern images, a feature extraction unit configured to extract a feature quantity from the plural pattern images, a registration dictionary holding unit configured to register a feature quantity of the object, and a similarity degree calculation unit configured to calculate a similarity degree between the extracted feature quantity and the registered feature quantity of the object and to recognize the object based on the calculated similarity degree.

Embodiments of the present invention further include a method which, when performed by a computer processor, uses an image obtained by photographing an object having a three-dimensional shape and performs image recognition of the object. Embodiments of the present invention also include a non-transitory computer-readable storage device storing instructions which, when executed on a processor, perform a method for image recognition of an object having a three-dimensional shape, from a photographed image of the object.

According to the embodiments of the invention, by creating the three-dimensional model using the three-dimensional shape information, the recognition can be performed with high precision from an arbitrary number of images and by using a general camera.

DETAILED DESCRIPTION OF THE INVENTION

First Embodiment

Hereinafter, an image recognition apparatus 10 of a first embodiment of the invention will be described with reference to FIGS. 1 and 2.

(1) Structure of the Image Recognition Apparatus 10

Figure 1:
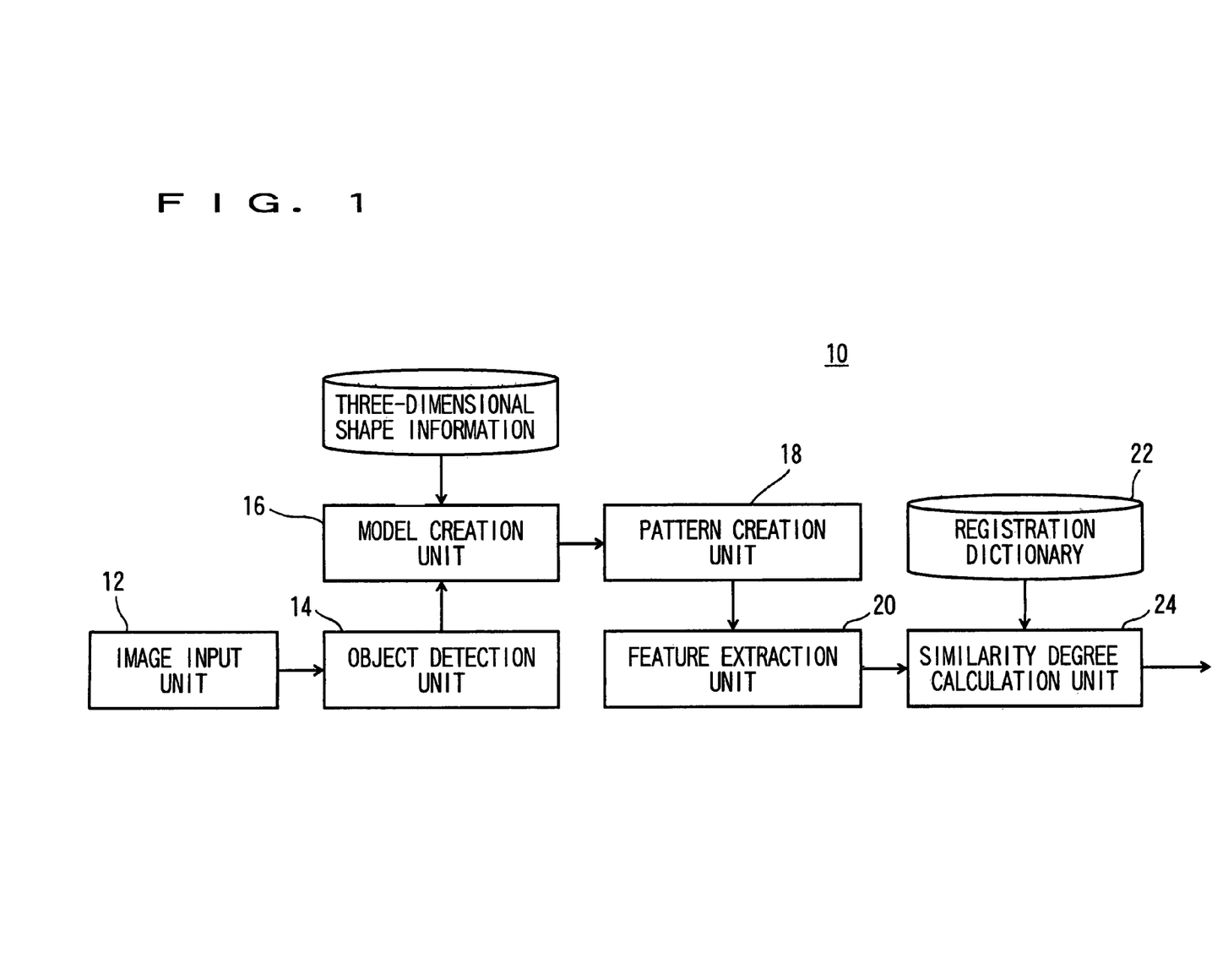
FIG. 1 is a block diagram showing a structure of a first embodiment of the invention.
Figure 2:
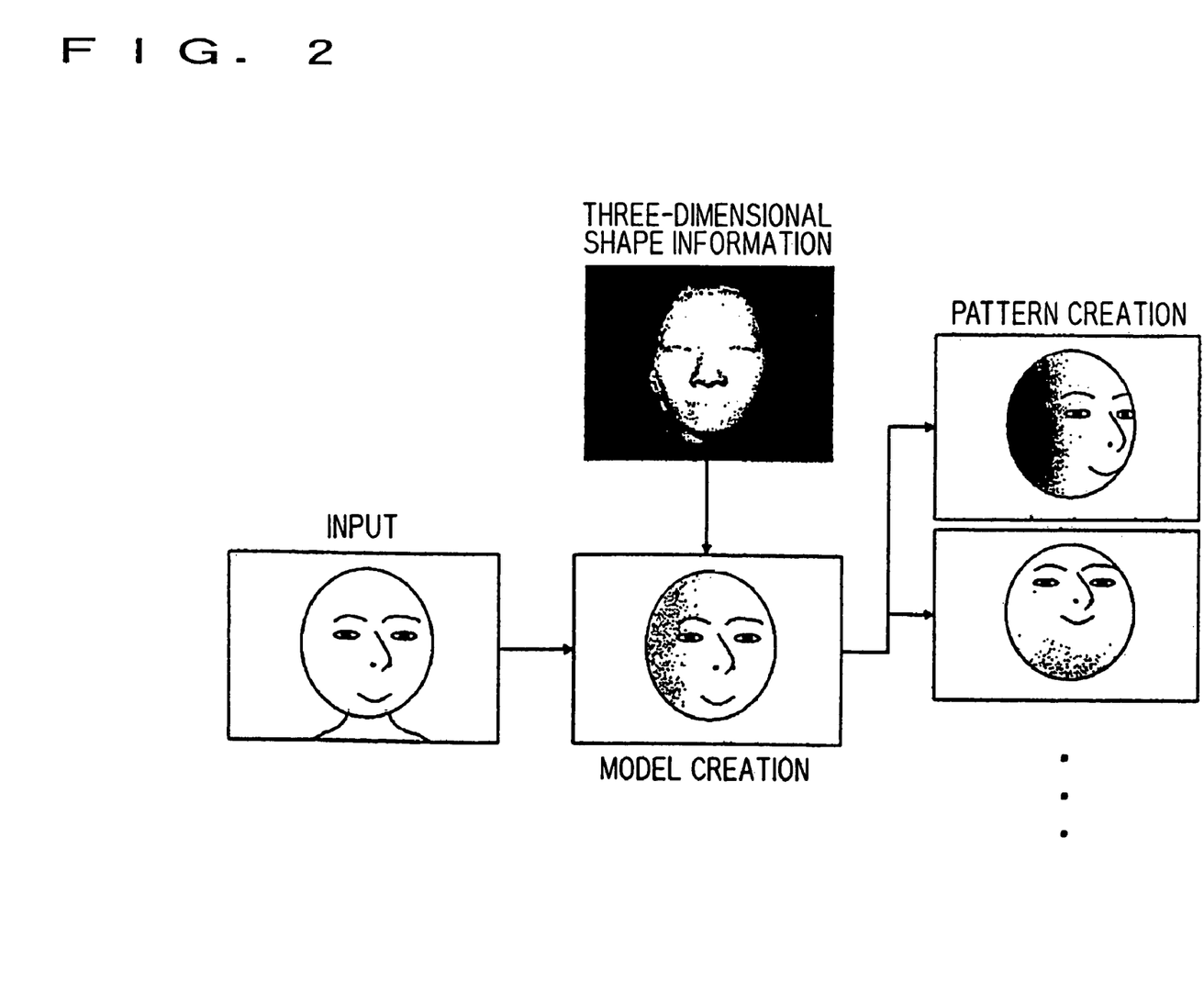
FIG. 2 is a conceptual view in pattern image creation from a three-dimensional model.

As shown in a block diagram of FIG. 1, the image recognition apparatus 10 of this embodiment includes an image input unit 12 for inputting a face of an objective person, an object detection unit 14 for detecting the face of the person from the inputted image, a model creation unit 16 for creating a three-dimensional face model by using the detected face and previously held three-dimensional shape information, a pattern creation unit 18 for creating a face pattern image from the created three-dimensional face model, a feature extraction unit 20 for extracting a feature quantity used for recognition from the created face pattern image, and a similarity degree calculation unit 24 for calculating a similarity degree to a previously registered registration dictionary 22.

Hereinafter, the operation of the image recognition apparatus 10 will be described with reference to FIG. 1.

(2) Image Input Unit 12

First, the image input unit 12 inputs a face image as a processing object. As an example of devices constituting the image input unit 12, a USB camera or a digital camera can be named. Besides, a recording device storing previously photographed and held face image data, a video tape, a DVD or the like may be used, or a scanner for scanning a face photograph may be used. An image may be inputted through a network.

The image obtained by the image input unit 12 is sequentially sent to the object detection unit 14.

(3) Object Detection Unit 14

The object detection unit 14 detects coordinates of face parts in the image as face feature points. Although any method may be used to detect the face feature points, the detection can be performed by using, for example, a method of Fukui and Yamaguchi ("Facial Feature Extraction Method based on Combination of Shape Extraction and Pattern Matching", SINGAKURON (D-II), vol. J80-D-II, No. 9, p. 2170-2177, 1997).

The feature points to be detected may be any of a pupil, nostril, mouth end, outer corner of an eye, inner corner of an eye, tip of nose, mouth contour, mouth middle point, eyebrow end, face contour and jaw as long as they are four or more points which do not exist on the same plane. Besides, the feature points to be outputted may be plural sets of points. For example, different feature points perturbed in an arbitrary direction with respect to detected feature points are calculated and can be outputted. At this time, the processing of the model creation and the pattern creation is performed by the number of the sets of the outputted feature points, and the integration is performed in the feature extraction unit 20, so that the processing can be performed independently of the number of the sets of the outputted feature points.

(4) Model Creation Unit 16

The model creation unit 16 uses the previously held three-dimensional shape information and creates the three-dimensional face model. The model creation unit 16 may use someone else's three-dimensional shape information.

In the three-dimensional shape information, the coordinates of the three-dimensional shape, which becomes the origin of the three-dimensional model of the human face as the recognition object, are stored, and especially the coordinates $(x_i', y_i', z_i')$ of the respective points of the face feature points, such as the pupil, nostril, and mouth end, are stored.

A face feature point $(x_i, y_i)$ obtained from the object detection unit 14 and the corresponding face feature point $(x_i', y_i', z_i')$ on the model are used, and a camera motion matrix M is defined by expression (1), expression (2) and expression (3).

$$W=[x_i-\bar{x}, y_i-\bar{y}]^T \tag{1}$$

$$S=[x_i'-\bar{x}', y_i'-\bar{y}', z_i'-\bar{z}'] \tag{2}$$

$$W=MS \tag{3}$$

$$M=WS^\dagger \tag{4}$$

$$(\bar{x}, \bar{y}) \tag{A}$$

$$(\bar{x}', \bar{y}', \bar{z}') \tag{B}$$

$$S^\dagger \tag{C}$$

Where, expression (A) indicates the barycenter of feature points on the input image, and expression (B) indicates the barycenter of feature points on the three-dimensional face model. By calculating a matrix of expression (C) as a generalized inverse matrix of a matrix S of expression (3), the camera motion matrix M is calculated based on expression (4).

Next, by using the calculated camera motion matrix M, the texture of the three-dimensional face model is estimated from the input image. An arbitrary coordinate (x', y', z') on the three-dimensional model can be transformed into a coordinate (s, t) on the corresponding input image by expression (5). Incidentally, the texture means image information, such as color, put on each coordinate.

$$\begin{bmatrix} s \\ t \end{bmatrix} = M \begin{bmatrix} x' - \bar{x}' \\ y' - \bar{y}' \\ z' - \bar{z}' \end{bmatrix} \quad (5)$$

Accordingly, a pixel value T(x', y', z') of a texture image at the coordinate (x', y', z') on the three-dimensional model is defined by using a pixel value I(x, y) on the input image and by expression (6).

$$T(x',y',z')=I(s+\bar{x},t+\bar{y}) \quad (6)$$

The texture image can be calculated by performing calculation on all pixels on the texture image with respect to expression (5) and expression (6). The texture image and the three-dimensional shape information are made into the three-dimensional face model. The pixel value T(x', y', z') may be calculated by interpolation using pixel values near the coordinate (s, t) on the input image.

(5) Pattern Creation Unit 18

Next, the pattern creation unit 18 uses the obtained three-dimensional face model and creates the face pattern image.

The three-dimensional face model is made to have an arbitrary posture, rendering is performed by using a technique of computer graphics, and the face pattern image with respect to the arbitrary posture can be extracted. The plural face pattern images are created while the posture is variously changed. FIG. 2 is a conceptual view of a case where face pattern images are created while the posture of the three-dimensional model is changed. Incidentally, the face pattern images are images obtained by projecting the three-dimensional model of the face onto a plane in plural different directions.

Although the posture may be changed in any way, for example, the face is changed in the vertical or horizontal direction by every degree within the range of from −5 degrees to +5 degrees, or the angle of the model is calculated from the camera movement matrix and the angle is relatively changed from the angle of the model, and the face pattern image may be extracted.

As the parameters of the angle, any value may be used within the range where the face can be seen as a result of the rendering.

Incidentally, since the coordinates of the face feature points after the rendering can be calculated geometrically, the face pattern image can be extracted from the result of the rendering and relative to an arbitrary face feature point.

(6) Feature Extraction Unit 20

Next, the feature necessary for identification is extracted by the face feature extraction unit 20.

Since the plural face pattern images are obtained by the pattern creation unit 18, these are regarded as, for example, feature vectors having pixel values as elements, a generally known K-L expansion is performed, and obtained orthonormal basis vectors are used as the feature quantity of the person corresponding to the input image.

At the time of the registration of a person, this feature quantity is recorded. Any way of selecting the elements of the feature vector, or any creation method may be performed. Besides, any image processing, such as a differential processing or histogram equalization, may be performed on the feature vector, and the feature quantity creation method is not limited to this.

(7) Similarity Degree Calculation Unit 24

Next, the similarity degree calculation unit 24 calculates the similarity degree between the previously calculated feature quantity and the feature quantity to the input calculated in the feature extraction unit 20.

Although any method may be used for the similarity degree calculation, for example, a mutual subspace method described by O. Yamaguchi and K. Fukui mentioned in "BACKGROUND OF THE INVENTION" is used. By such a recognition method, the similarity degree between the face feature quantities can be calculated. The similarity degree is judged based on a certain predetermined threshold value, and the person is identified. The threshold value may be a value determined by a previous recognition experiment, or can be increased/decreased according to the feature quantity of the person.

(8) Effects of this Embodiment

As described above, according to the image recognition apparatus 10 of the first embodiment, by using the three-dimensional shape information to create the three-dimensional face model, the recognition can be performed with high precision from an arbitrary number of images and by using a general camera.

Second Embodiment

An image recognition apparatus 10 of a second embodiment of the invention will be described with reference to FIGS. 3 and 4.

(1) Structure of the Image Recognition Apparatus 10

Figure 3:
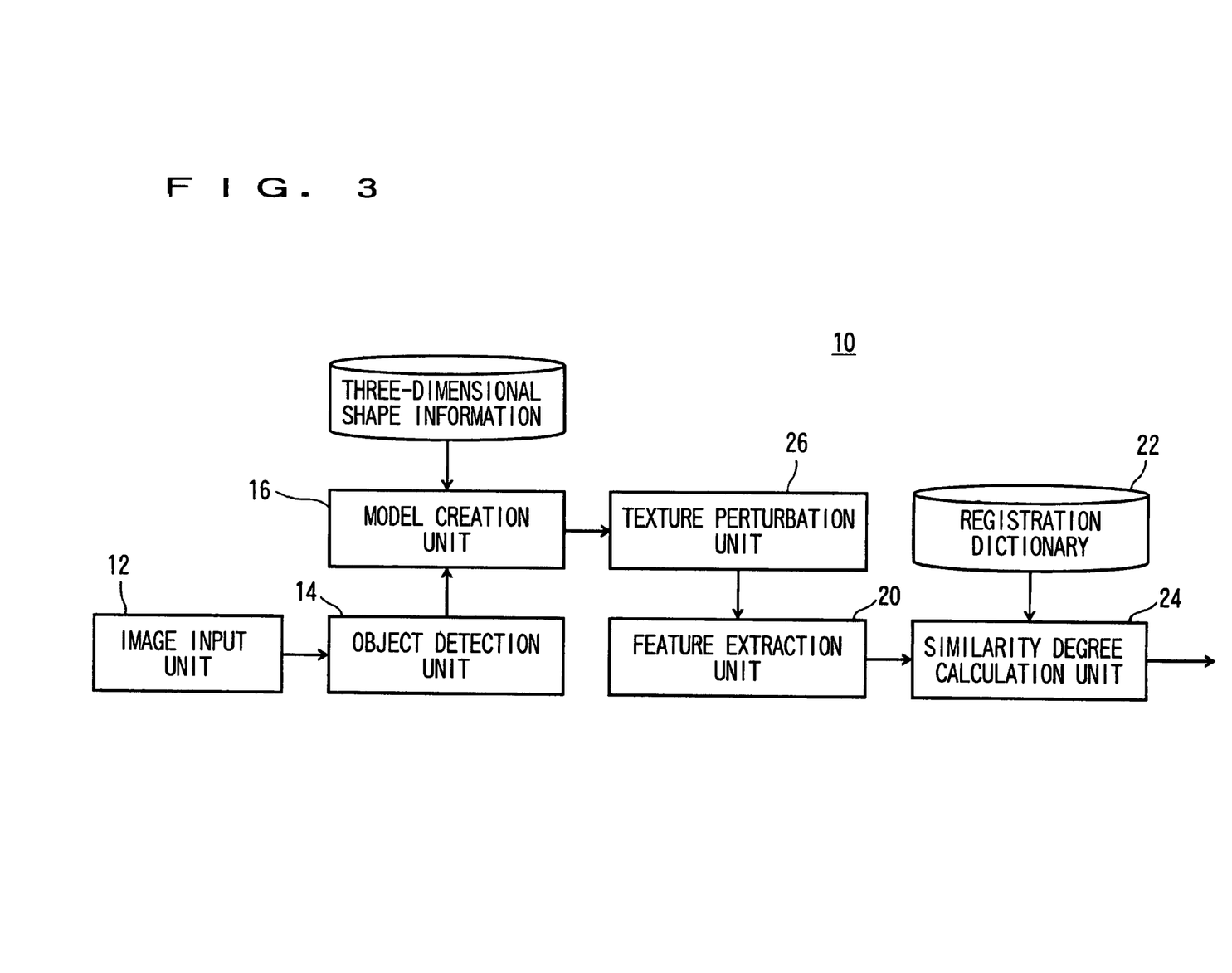
FIG. 3 is a block diagram showing a structure of a second embodiment of the invention.
Figure 4:
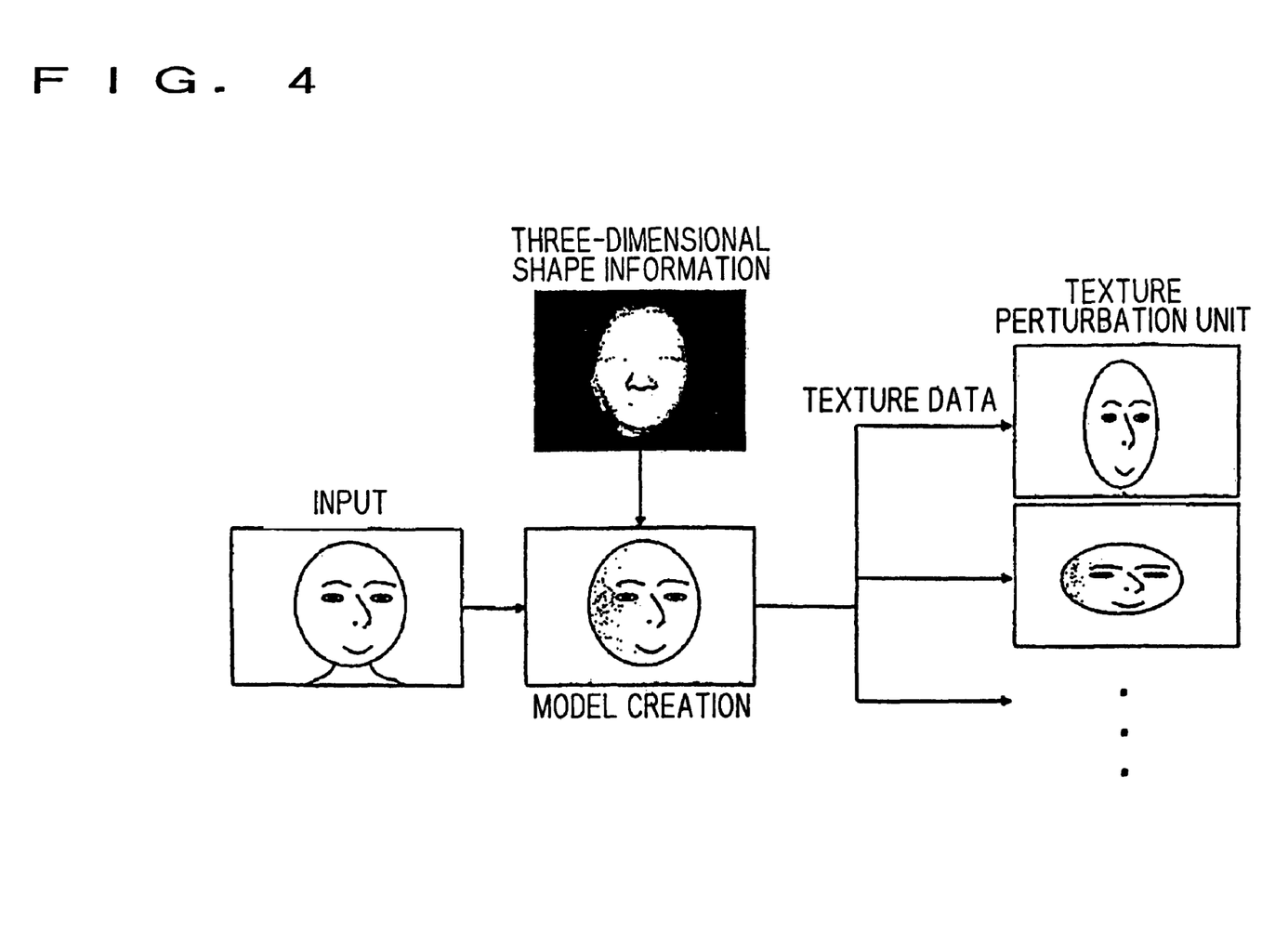
FIG. 4 is a conceptual view in pattern image creation from a texture image.

As shown in a block diagram of FIG. 3, the image recognition apparatus 10 of this embodiment includes an image input unit 12 for inputting a face of an objective person, an object detection unit 14 for detecting the face of the person from the inputted image, a model creation unit 16 for creating a three-dimensional face model by using the detected face and previously held three-dimensional shape information, a texture perturbation unit 26 for creating plural face pattern images from a texture, a feature extraction unit 20 for extracting a feature quantity used for recognition from the created face pattern images, and a similarity degree calculation unit 24 for calculating a similarity degree to a previously registered registration dictionary 22.

Incidentally, the image input unit 12, the object detection unit 14, the three-dimensional shape information, the model creation unit 16, the feature extraction unit 20, the registration dictionary 22, and the similarity degree calculation unit 24 are the same as those described in the first embodiment.

(2) Texture Perturbation Unit 26

Next, the texture perturbation unit 26 as a characteristic portion of this embodiment will be described.

The texture perturbation unit 26 uses the texture obtained from the model creation unit 16 and creates plural face pattern images. Since the correspondence between coordinates on the obtained texture and coordinates on the three-dimensional face model is established, the coordinates of face feature points in the texture are known. The face pattern image is cut out by using the coordinates of the face feature points in this texture.

At this time, with respect to the face feature points, the correspondence is established not only in the face feature points obtained from the object detection unit 14, but also in all coordinates three-dimensionally at the time of model creation, so an arbitrary point of the face may also be selected again as the face feature point.

With respect to the cutting method of the face pattern image, any cutting method may be used, for example, normalization may be made so that the interval between both pupils becomes equal, or the barycenter of feature points is positioned at the center of the pattern image.

Besides, the pattern image may be expanded/contracted in arbitrary directions of left, right, top, bottom and the like.

Besides, a different face pattern image can be created by perturbing the coordinate of the face feature point at the time of cutting in an arbitrary direction. The quantity of perturbation may be within any range.

Besides, also with respect to the kind of the face feature point to be perturbed, one or all feature points can be arbitrarily combined, and also with respect to the direction in which perturbation is made, the perturbation can be made not only in a direction vertical or horizontal to the image, but also in an arbitrary direction. For example, when both eyes are selected as the face feature points, when the perturbation is made within the range of −2 to +2 pixels in each of the horizontal and vertical directions, 625 face pattern images can be created from the texture obtained from the model creation unit 16. FIG. 4 is a conceptual view of a case where a texture image is changed one-dimensionally.

(3) Effects of this Embodiment

As described above, according to the image recognition apparatus 10 of the second embodiment, from the created three-dimensional face model, rendering is not performed based on the technique of computer graphics, and the plural face pattern images are created from the texture, so that the recognition can be performed at high speed.

Third Embodiment

An image recognition apparatus 10 of a third embodiment of the invention will be described with reference to FIG. 5.

(1) Structure of the Image Recognition Apparatus 10

Figure 5:
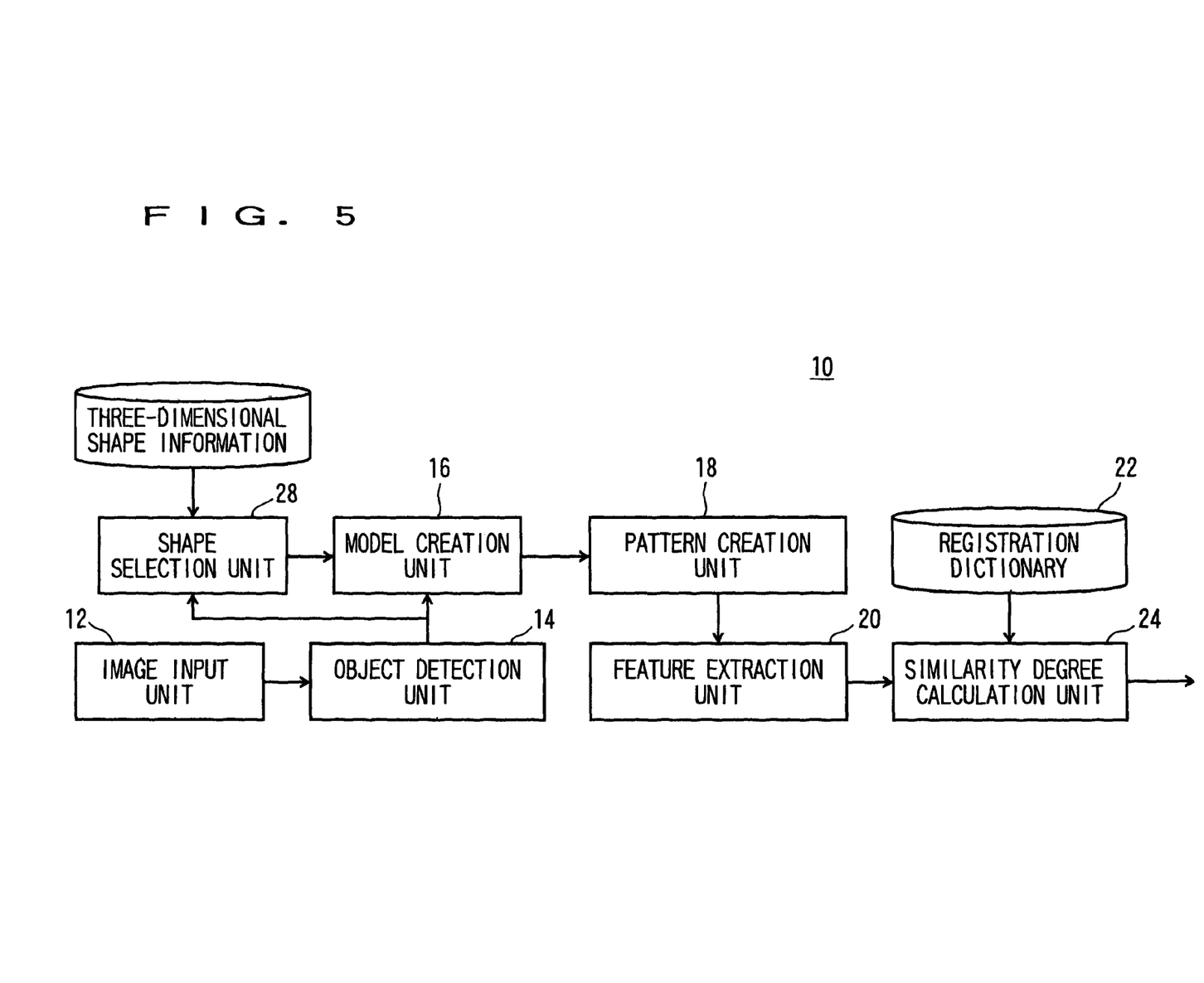
FIG. 5 is a block diagram showing a structure of a third embodiment of the invention.

As shown in a block diagram of FIG. 5, the image recognition apparatus 10 of this embodiment includes an image input unit 12 for inputting a face of an objective person, an object detection unit 14 for detecting the face of the person from the inputted image, a shape selection unit 28 for selecting suitable three-dimensional shape information by using previously held three-dimensional shape information and a result from the object detection unit 14, a model creation unit 16 for creating a three-dimensional face model by using the three-dimensional shape information obtained from the shape selection unit 28, a pattern creation unit 18 for creating a face pattern image from the three-dimensional face model, a feature extraction unit 20 for extracting a feature quantity used for recognition from the created face pattern image, and a similarity degree calculation unit 24 for calculating a similarity degree to a previously registered registration dictionary 22.

Incidentally, the image input unit 12, the object detection unit 14, the three-dimensional shape information, the model creation unit 16, the pattern creation unit 18, the feature extraction unit 20, the registration dictionary 22, and the similarity degree calculation unit 24 are the same as those described in the first embodiment.

(2) Shape Selection Unit 28

Next, the shape selection unit 28 as a characteristic portion of this embodiment will be described.

The shape selection unit 28 selects suitable three-dimensional shape information based on the feature point obtained from the object detection unit 14 and from previously held plural pieces of three-dimensional shape information.

When the feature points are obtained from the object detection unit 14, with respect to the positional relation among those feature points, the distance between the equivalent feature points is previously measured also in the three-dimensional shape, and one of plural three-dimensional shapes in which the distance is closest is outputted.

A criterion for the feature points and distance calculation may be selected in any way. For example, the distance between the eye and the nose is calculated, and a three-dimensional shape in which the distance is closest is outputted.

Besides, in the case where not only the geometrical structure of a face, but also male and female, races and the like are given as information, based on those, three-dimensional shape for each of the male and female, races and the like is prepared, and an appropriate three-dimensional shape can also be outputted. At this time, a judgment of the male and female, races and the like may be automatically performed by using pattern matching or the like.

Besides, the three-dimensional shape to be outputted is not limited to one, and the three-dimensional shapes satisfying a threshold value at the time of three-dimensional shape selection or all three-dimensional shapes are outputted, the subsequent processings such as the model creation are performed for the outputted models, and they may be combined in the feature extraction unit 20. In the feature extraction unit 20, since plural images from the pattern creation unit 18 can be combined, irrespective of the number of models and the number of pattern images to be outputted, the feature extraction can be performed quite similarly to the case of one model.

(3) Effects of this Embodiment

As described above, according to the image recognition apparatus 10 of the third embodiment, by selecting the appropriate three-dimensional shape for the inputted image, the recognition can be performed with higher precision.

Fourth Embodiment

An image recognition apparatus 10 of a fourth embodiment of the invention will be described with reference to FIG. 6.

(1) Structure of the Image Recognition Apparatus 10

Figure 6:
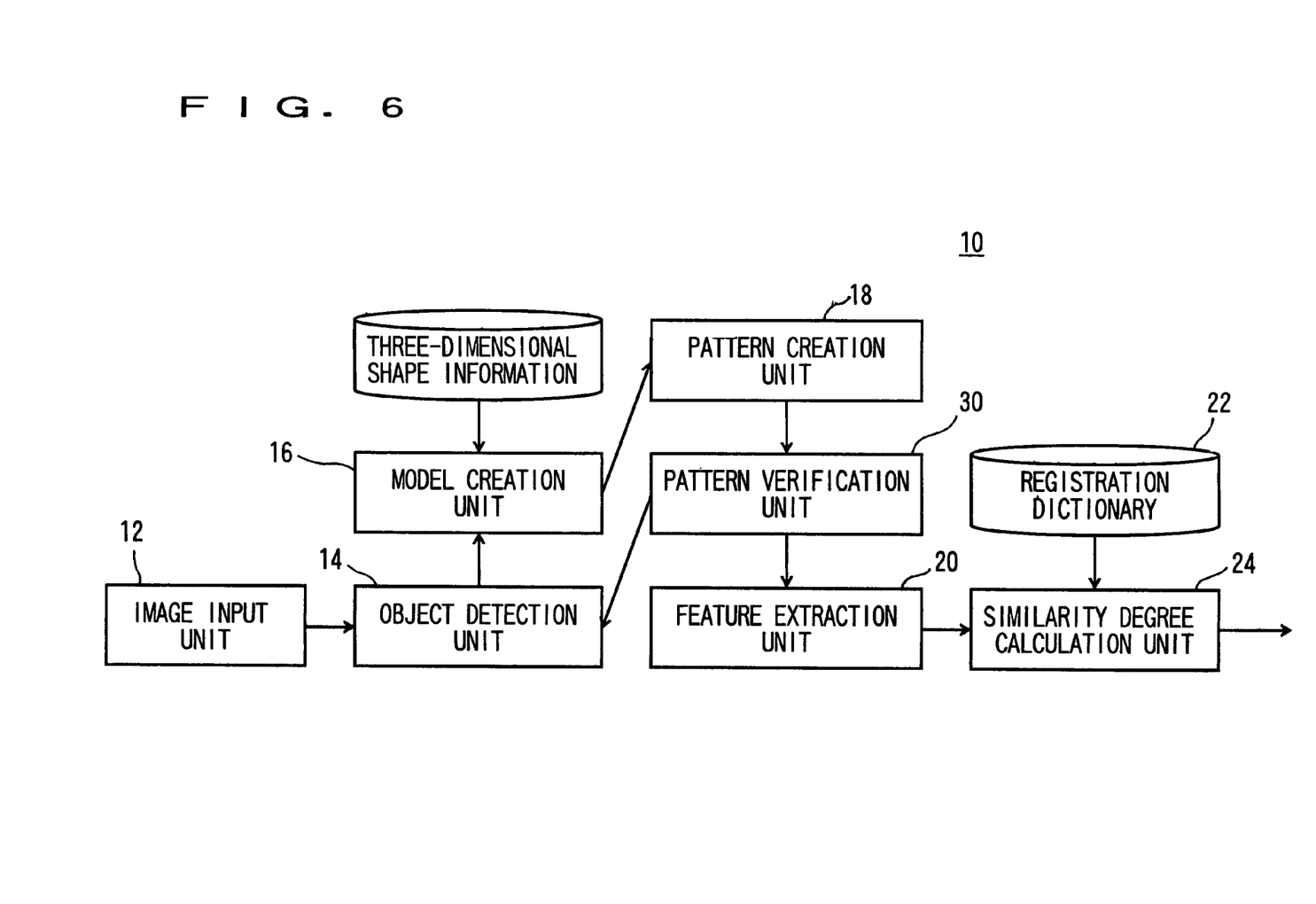
FIG. 6 is a block diagram showing a structure of a fourth embodiment of the invention.

As shown in a block diagram of FIG. 6, the image recognition apparatus 10 of this embodiment includes an image input unit 12 for inputting a face of an objective person, an object detection unit 14 for detecting the face of the person from the inputted image, a model creation unit 16 for creating a three-dimensional face model by using the detected face and previously held three-dimensional shape information, a pattern creation unit 18 for creating a face pattern image from the three-dimensional face model, a pattern image verification unit 30 for verifying a feature point obtained from the object detection unit 14 by using the created face pattern image, a feature extraction unit 20 for extracting a feature quantity used for recognition from the created face pattern image, and a similarity degree calculation unit 24 for calculating a similarity degree to a previously registered registration dictionary 22.

Incidentally, the image input unit 12, the object detection unit 14, the three-dimensional shape information, the model creation unit 16, the pattern creation unit 18, the feature extraction unit 20, the registration dictionary 22, and the similarity degree calculation unit 24 are the same as those described in the first embodiment.

(2) Pattern Image Verification Unit 30

Next, the pattern image verification unit 30 as a characteristic portion of this embodiment will be described.

The pattern image verification unit 30 uses the face model obtained from the model creation unit 16, and verifies whether the face feature point obtained in the feature extraction unit 20 is correct.

An angle of a model is estimated as a reference angle from the camera motion matrix calculated in expression (4), and the three-dimensional face model obtained in the model creation unit 16 is rotated to the reference angle, and rendering is performed based on the technique of computer graphics.

At this time, in the case where the detected feature point is shifted from the correct position and is erroneously extracted, the rendering result is significantly different from an image inputted in the image input unit 12 or a standard face pattern and is outputted. The difference in this pattern image is verified, and in the case where it exceeds a certain threshold value, a judgment is made that the feature point detection is erroneous and the feature point detection is again performed. With respect to the difference in the pattern image, any method may be used. For example, the sum of absolute values of brightness differences of two pattern images (SAD: Sum of Absolute Difference) or the like can be used.

Besides, the verification may be performed on the whole of the rendered pattern image, or the verification may be performed only on the vicinity of a noted feature point, or plural vicinities of the feature point may be combined.

(3) Effects of this Embodiment

As described above, according to the image recognition apparatus 10 of the fourth embodiment, the detected face feature point can be verified from the created three-dimensional face model, and the recognition can be performed with higher precision.

Fifth Embodiment

An image recognition apparatus 10 of a fifth embodiment of the invention will be described with reference to FIG. 7 and FIG. 8.

(1) Structure of the Image Recognition Apparatus 10

Figure 7:
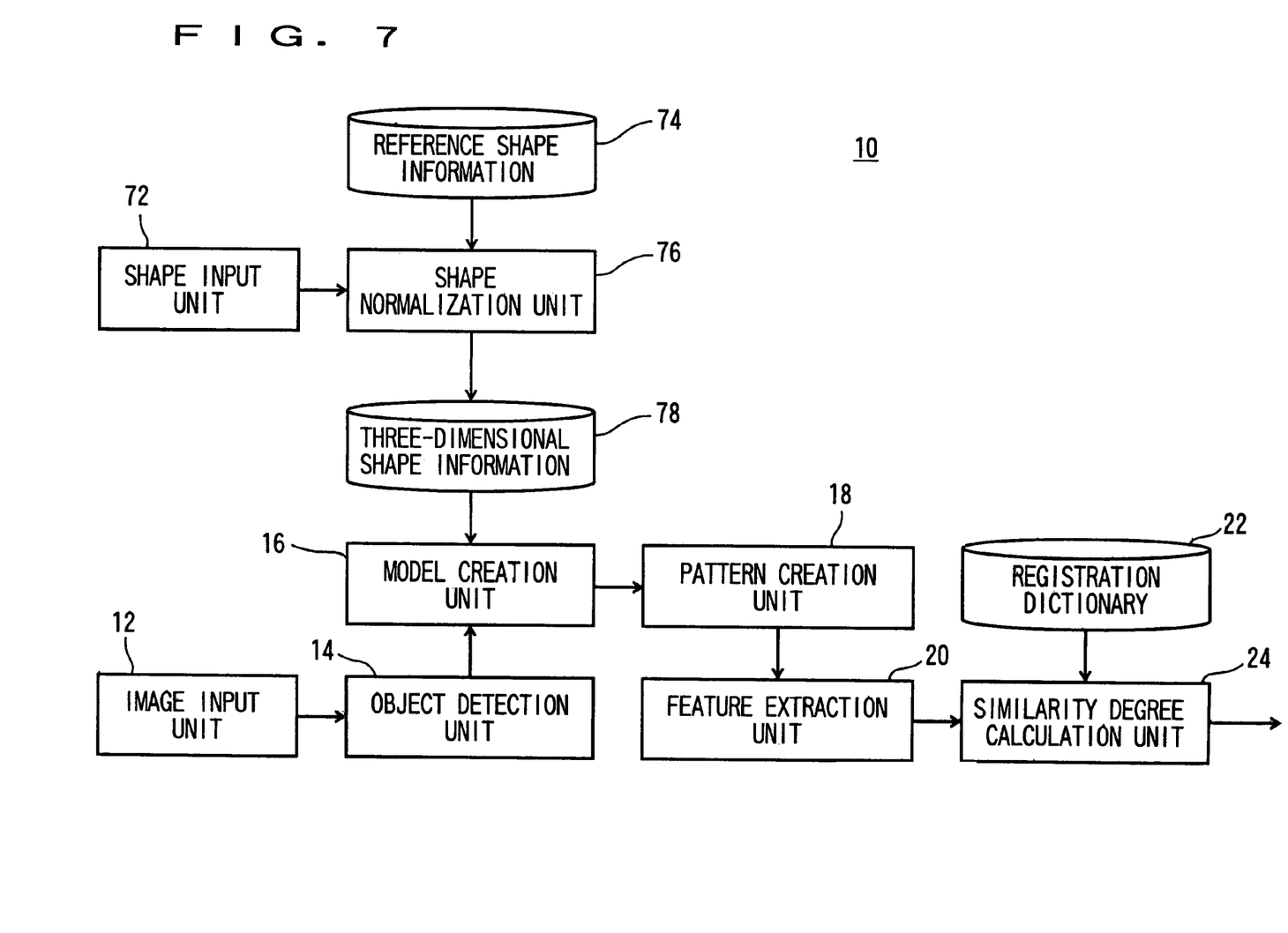
FIG. 7 is a block diagram showing a structure of a fifth embodiment of the invention.

As shown in a block diagram of FIG. 7, the image recognition apparatus 10 of this embodiment includes an image input unit 12 for inputting a face of an objective person, an object detection unit 14 for detecting the face of the person from the inputted image, a shape input unit 72 for inputting a three-dimensional shape of the face of the objective person, a shape normalization unit 76 for normalizing the inputted face shape by using previously held reference shape information 74, a model creation unit 16 for creating a three-dimensional face model by using the detected face and normalized three-dimensional shape information 78, a pattern creation unit 18 for creating a face pattern image from the three-dimensional face model, a feature extraction unit 20 for extracting a feature quantity used for recognition from the created face pattern image, and a similarity degree calculation unit 24 for calculating a similarity degree to a previously registered registration dictionary 22.

Incidentally, the image input unit 12, the object detection unit 14, the model creation unit 16, the pattern creation unit 18, the feature extraction unit 20, the registration dictionary 22, and the similarity degree calculation unit 24 are the same as those described in the first embodiment.

(2) Shape Input Unit 72

In the shape input unit 72, the three-dimensional shape (an input shape 82 of FIG. 8) of the face of the objective person obtained by a device capable of measuring a three-dimensional shape of an object, such as a range finder, is inputted. Since some range finder can acquire not only the three-dimensional shape but also the image of the photographed object simultaneously, the image input unit 12 and the shape input unit 72 may be made of the same equipment. Besides, the shape may be obtained by a stereo method from plural images, and a method of obtaining the shape of the recognition object is not limited to these.

It is assumed that the shape inputted to the shape input unit 72 of this embodiment is an image (depth map) in which a depth (z-coordinate value) is a pixel value.

Incidentally, a mesh structure (for example, VRML (Virtual Reality Modeling Language)) in which plural vertices constituting the shape and a coupling relation among the vertices are described may be inputted to the shape input unit 72. In this case, the shape input unit 72 obtains the depth map by interpolating a depth at an arbitrary coordinate by a linear function from plural vertices of the mesh structure, a spline function, and the like.

(3) Shape Normalization Unit 76

Figure 8:
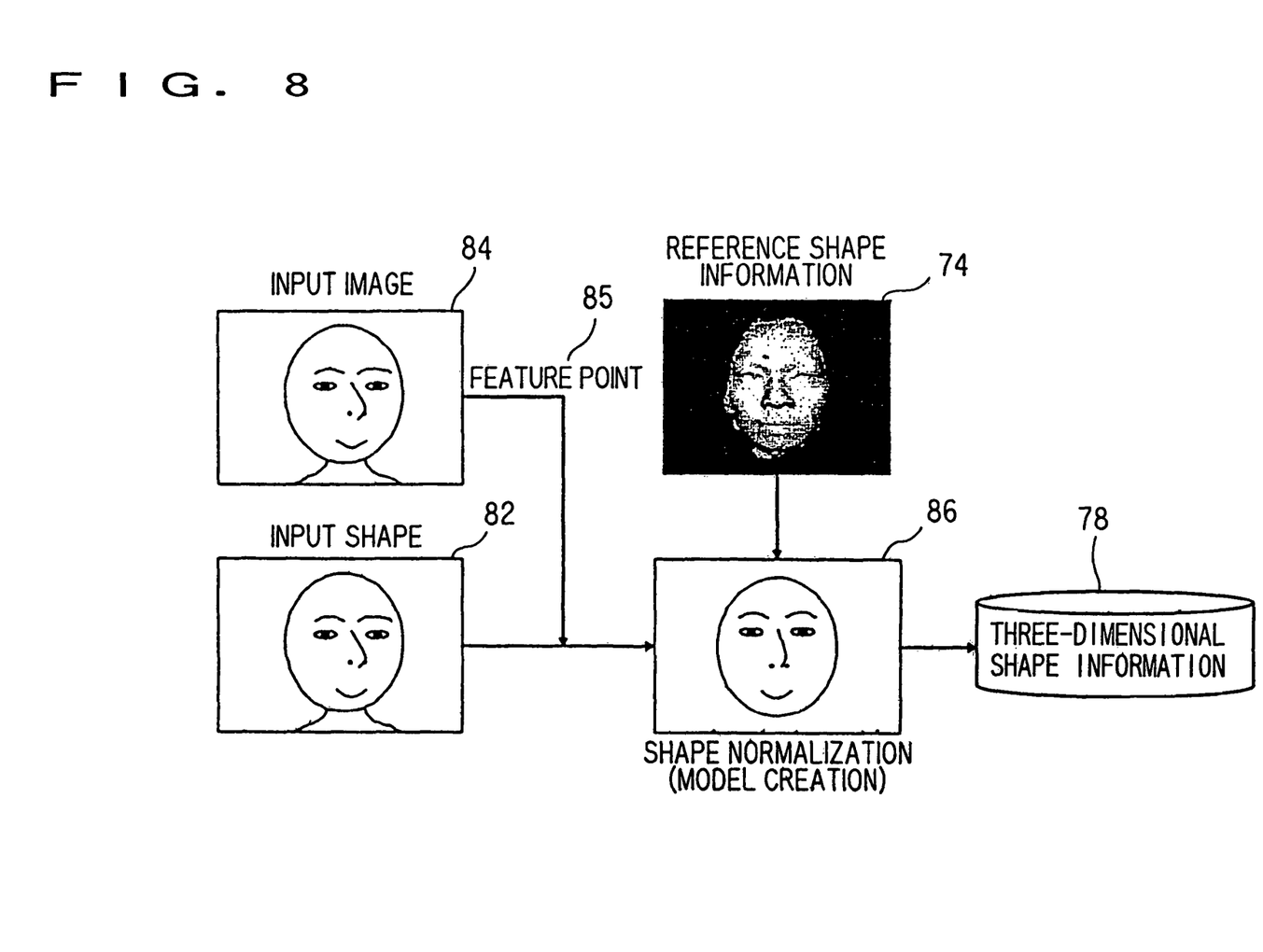
FIG. 8 is a conceptual view in shape normalization from an input shape.

FIG. 8 is a conceptual view of shape normalization from the input shape 82. The shape normalization unit 76 normalizes the input shape 82 as the three-dimensional shape inputted in the shape input unit 72 by using the previously held reference shape information 74, and creates the three-dimensional shape information 78.

First, the shape normalization unit 76 extracts feature points on the input shape 82. The kinds of the feature points to be extracted may be any of a pupil, nostril, mouth end, outer corner of an eye, inner corner of an eye, tip of nose, mouth contour, mouth middle point, eyebrow end, face contour and jaw as long as they are four or more points which do not exist on the same plane. They may be the same as the feature points extracted in the object detection unit 14, or may be different therefrom.

In the case where the correspondence between the input image 84 and the input shape 82 is established, feature points (feature points 85 of FIG. 8) which are detected by the object detection unit 14 from the input image 84 can be used for the input shape as it is. In the case where the correspondence between the input image 84 and the input shape 82 is not established, feature points on the input shape 82 are extracted by, for example, pattern matching. Alternatively, a person may specify feature points by using a pointing device.

As described above, the input shape 82 can be regarded as the image. Thus, the shape normalization unit 76 uses the feature point 85 extracted from the input shape 82 or the input image 84, the input shape 82, and the previously held reference shape information 74, and performs the same processing as that of the model creation unit 16, so that the model can be created.

The texture image of the created model is an image in which a z coordinate indicates a pixel value. The shape normalization unit 76 transforms this into the three-dimensional shape information 78 as the normalized three-dimensional shape. When the face model of the input image 84 is created, the model creation unit 16 of this embodiment uses the three-dimensional shape information 78.

Incidentally, as the reference shape information 74, any information may be used. For example, the three-dimensional shape of a general face of a person as a recognition object, which has been described in the first embodiment, can be used. Besides, by performing such an iterative operation that a new reference shape is created from the average of normalized input shapes and the input shape is again created, the precision of the normalization can also be raised.

(4) Effects of this Embodiment

As described above, according to the image recognition apparatus 10 of the fifth embodiment, the three-dimensional shape information is normalized for each individual by using the reference shape information 74, and the face model can be created based on the normalized three-dimensional shape information 78 for each individual, and therefore, the recognition can be performed with higher precision.

MODIFIED EXAMPLES

In the image input unit, an image (depth map) having a depth as a pixel value may be inputted from a device capable of measuring a three-dimensional shape, such as a range finder. In that case, the registration dictionary also uses feature quantities created from the depth map, and the calculation of a similarity degree is performed.

In the model creation unit, when the camera motion matrix is obtained from expression (3), not only a method of obtaining a generalized inverse matrix, but also any method may be used. For example, M-estimation as one of robust estimations is used, and the camera motion matrix can be obtained as described below.

$$\epsilon_M = \|W - MS\| \quad (7)$$

$$\tilde{M} = \arg\min_M \rho(\epsilon_M) \quad (8)$$

$$\rho(x) = \frac{x^2}{\rho + x^2} \quad (9)$$

When an estimated error $\epsilon\_\{M\}$ of the camera motion matrix is defined as in expression (7), as indicated in expression (8), <M> which minimizes the estimated error is solved in accordance with the evaluation reference function $\rho(x)$ to obtain the camera motion matrix. Incidentally, "<M>" denotes such a character that a tilde is attached to "M". Although any evaluation reference function $\rho(x)$ may be used, for example, expression (9) is known. Incidentally, σ of expression (9) denotes a scale parameter.

Incidentally, the invention is not strictly limited to the above embodiments, but can be embodied at the practical state while structural elements are modified within the range not departing from the gist thereof.

Besides, various inventions can be formed by suitable combinations of plural structural elements disclosed in the embodiments. For example, some structural elements may be deleted from all structural elements described in the embodiment.

Further, structural elements over different embodiments may be suitably combined.

For example, in the respective embodiments, although the image recognition is performed while the human face is made the object, instead of this, the invention may be used for image recognition of other three-dimensional objects. As the three-dimensional objects, for example, the whole body of a person, an automobile, an airplane, a ship and the like are enumerated.

What is claimed is:

1. An apparatus which uses an image obtained by photographing an object having a three-dimensional shape and performs image recognition of the object, the apparatus comprising:
   an image input device to which the image is inputted;
   a three-dimensional shape information holding unit configured to store three-dimensional shape information as an origin of a three-dimensional model of the object;
   a model creation unit configured to create the three-dimensional model by using the input image and the three-dimensional shape information;
   a texture perturbation unit configured to perturb feature points on a texture image more than once, the texture image being estimated from the three-dimensional model, wherein the texture perturbation unit is configured to, for each time of perturbing the feature points:
   add two-dimensional shape deformation to the texture image; and
   cut out a pattern image by using the coordinates of the feature points;
   a feature extraction unit configured to extract a feature quantity from the plural pattern images;
   a dictionary holding unit configured to hold a dictionary feature quantity of the object; and
   a similarity degree calculation unit configured to calculate a similarity degree between the extracted feature quantity and the dictionary feature quantity of the object and to recognize the object based on the calculated similarity degree.

2. The apparatus according to claim 1, wherein the model creation unit includes:
   an object detection unit configured to extract a feature point from the input image;
   a texture estimation unit configured to estimate a texture of the three-dimensional model from the feature point of the input image and the three-dimensional shape information; and
   a calculation unit configured to calculate the three-dimensional model from the texture images and the three-dimensional shape information.

3. The apparatus according to claim 2, wherein the texture estimation unit estimates the texture images by a projection matrix calculated from a feature point in the three-dimensional information corresponding to the feature point of the input image.

4. The apparatus according to claim 3, wherein:
   the feature extraction unit calculates, as the extracted feature quantity, a subspace by analyzing the pattern image;
   the dictionary holding unit holds a dictionary subspace as the dictionary feature quantity of the object; and
   the similarity degree calculation unit calculates the similarity degree between the calculated subspace and the dictionary subspace.

5. The apparatus according to claim 4, further comprising a pattern verification unit configured to verify on basis of the three-dimensional model whether a detected position of the feature point on the pattern image that is created by the texture perturbation unit is of a correct position or not.

6. The apparatus according to claim 1, wherein the three-dimensional shape holding unit includes:
   a shape input unit configured to acquire three-dimensional shape information indicative of an input shape of the object;
   a reference shape information holding unit configured to store, as reference shape information, the acquired three-dimensional shape information to be used as the origin of the three-dimensional model of the object; and a shape normalization unit configured to normalize the reference shape information by using the input shape and the reference shape information.

7. A computer-implemented method which uses an image obtained by photographing an object having a three-dimensional shape and performs image recognition of the object, the method comprising the steps performed by a processor of:

inputting the image;

storing three-dimensional shape information as an origin of a three-dimensional model of the object;

creating the three-dimensional model by using the input image and the three-dimensional shape information;

creating plural pattern images by perturbing feature points on a texture image, which has been estimated from the three-dimensional model, more than once in a manner that the texture image is added with two-dimensional shape deformation at each time of perturbing of the feature points; and by cutting out a pattern image by way of using the coordinates of the feature points, for each time of perturbing of the feature points, extracting a feature quantity from the plural pattern images;

holding a dictionary feature quantity of the object; and calculating a similarity degree between the extracted feature quantity and the dictionary feature quantity of the object to recognize the object based on the calculated similarity degree.

8. A non-transitory computer-readable storage device storing a program including instructions which, when executed by a processor, perform a method of image recognition of an object having a three-dimensional shape, from a photographed image of the object, the method comprising:

inputting the image;

storing three-dimensional shape information as an origin of a three-dimensional model of the object;

creating the three-dimensional model by using the input image and the three-dimensional shape information;

creating a plurality of pattern images by perturbing feature points on a texture image more than once, the texture image being estimated from the three-dimensional model, wherein perturbing the feature points includes:

adding two-dimensional shape deformation to the texture image; and cutting out a pattern image by using the coordinates of the feature points;

extracting a feature quantity from the plural pattern images;

holding a dictionary feature quantity of the object; and calculating a similarity degree between the extracted feature quantity and the dictionary feature quantity of the object to recognize the object based on the calculated similarity degree.

* * * * *